Nov. 10, 1959  M. MANDEL  2,912,690
AERIAL NAVIGATION SYSTEM
Filed Dec. 30, 1957  2 Sheets-Sheet 2
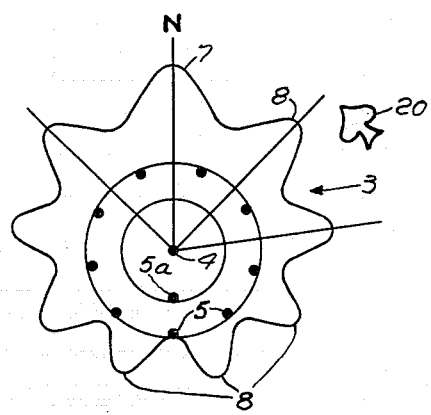
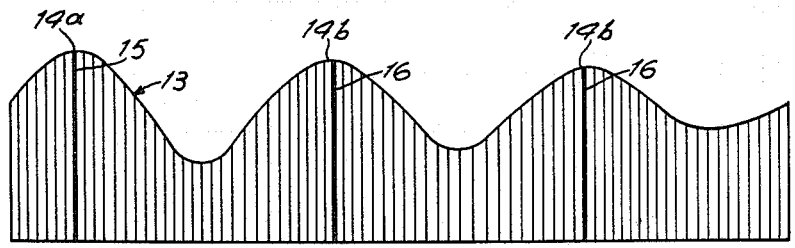
Inventor
MARK MANDEL

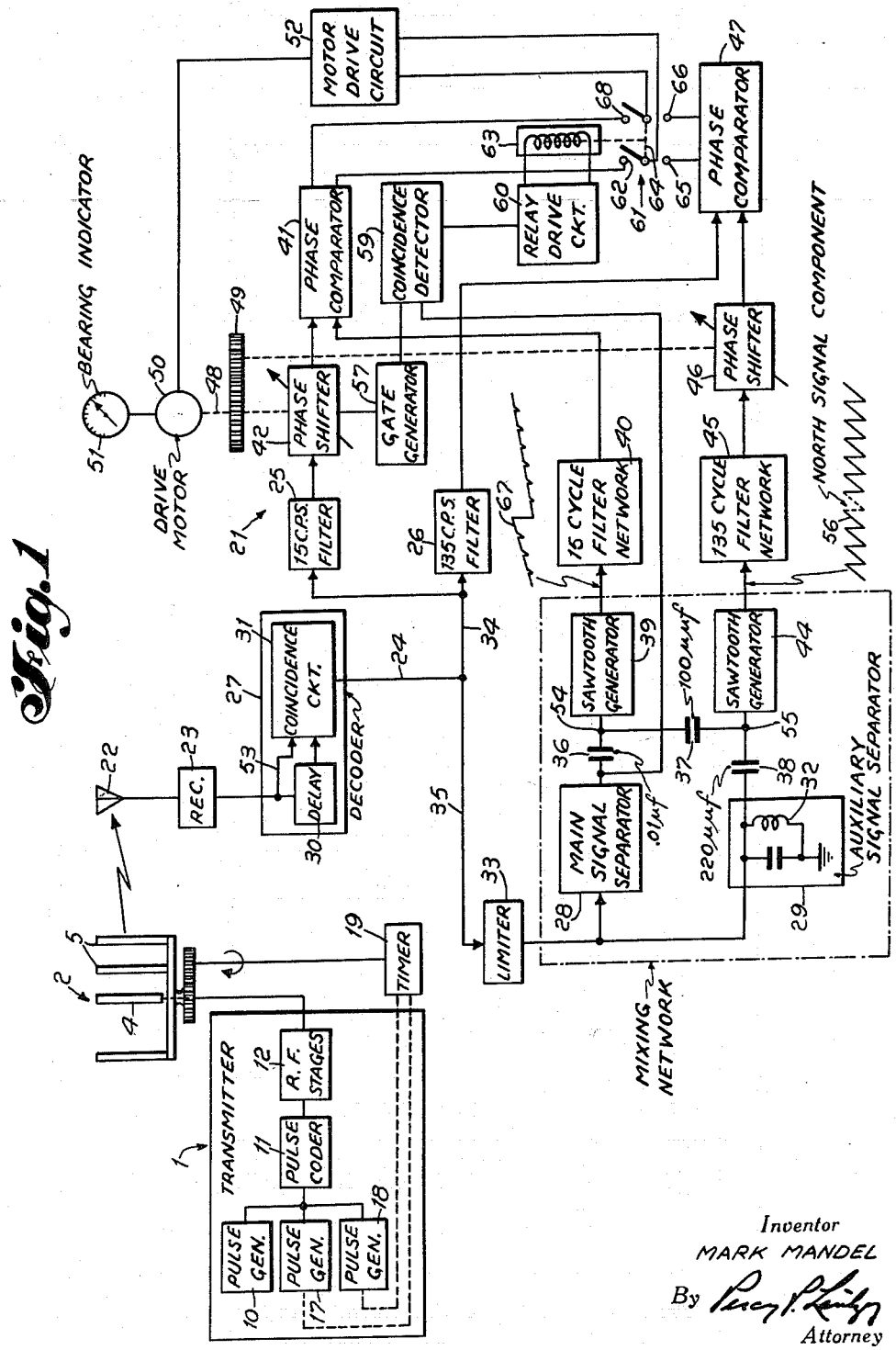

United States Patent Office 2,912,690
Patented Nov. 10, 1959

2,912,690
AERIAL NAVIGATION SYSTEM

Mark Mandel, Bloomfield, N.J., assignor to International Telephone and Telegraph Corporation, Nutley, N.J., a corporation of Maryland Application December 30, 1957, Serial No. 705,964

4 Claims. (Cl. 343—106)

This invention relates to omnirange navigation systems and more particularly to an aerial navigation system commonly referred to as TACAN.

In certain aerial navigation systems such as TACAN, azimuthal information is given by the relative phase between reference signals and a multi-lobed rotating antenna pattern which phase varies at different azimuthal positions with respect to the beacon. The beacon transmits several different types of pulse signals which the airborne radio set translates into bearing and distance information. The transmitting antenna system in the beacon produces a multi-lobed directional pattern rotating at about 15 cycles per second. To a receiver receiving the pulse signals from the transmitter, the rotation of the antenna pattern produces an amplitude modulation envelope on these pulses. When the major lobe of the direction pattern points in a given direction, such as north, a special signal in the form of a short burst of pulses is transmitted from the beacon, which signal is referred to as the "north reference signal." By comparing the phase of the modulation envelope, due to rotation of the beacon pattern, with that of the north signal, an indication of the bearing of the receiver with respect to the beacon is obtained. If only the north signal and a single lobed directional pattern were employed, only a relatively coarse indication of bearing would be obtainable. To obtain a finer indication, the directional pattern is multi-lobed with each lobe separated, for example, by 40 degrees from the next, and with auxiliary reference pulse signals in the form of short bursts of pulses being emitted each time one of these lobes passes the predetermined reference point (for example, the north) as the antenna pattern is rotated. The rotation of this pattern produces a modulation envelope of 135 cycles per second (9 lobes multiplied by 15 cycles per second) on top of the fundamental of 15 cycles per second due to the main directive lobe. At the receiver, the phase of the auxiliary pulse signal is compared with respect to that of the 135 cycle-per-second modulation envelope; and a fine azimuthal indication is obtained in addition to a coarse indication.

The standard TACAN signal as received by the receiver in the mobile craft is amplitude modulated by the transmitting rotating multi-lobed antenna. Due to the inherent structural design of this transmitting antenna as well as errors resulting from site effects, a corresponding variation in the percentage of modulation occurs. It has been found that as the percentage of modulation decreases, a point may be reached where the mobile receiver cannot discern between spurious noise and the usable 135 cycle-per-second component. This results in unreliable circuit operation and a corresponding inaccuracy in the bearing indication.

In addition, another error in bearing indication has resulted due to the following effects. As previously mentioned, the transmitted TACAN signal is composed of four components. These components are the fundamental 15 cycle-per-second component, a harmonic 135 cycle-per-second component, a "main" reference pulse signal, and an "auxiliary" reference pulse signal. The 15 and 135 cycle-per-second components form a complex wave which is used to amplitude modulate the combined main and auxiliary reference pulse signals. The main reference pulse signal is composed of 24 pulses having a repetition frequency of 15 cycles-per-second. The auxiliary reference pulse signal is composed of 12 pulses having a repetition frequency of 135 cycles-per-second. In the receiver, the 15 and 135 cycle-per-second components are separated and then phase compared with the main and auxiliary rference pulse signals to produce the bearing indications. To alleviate the errors in bearing indications due to changes in the percentage of modulation, the main and auxiliary reference pulse signals are converted into sine waves. Formerly, the harmonic 135 cycle-per-second component, which was directly affected by changes in the percentage of modulation, was phase shifted. However, since the auxiliary reference pulse signal is not affected by changes in the percentage of modulation, it is better to phase shift this component in lieu of the 135 cycle-per-second component, thus obtaining a more accurate bearing indication which is unaffected by changes in the percentage of modulation. In addition, when generating the train of auxiliary reference pulses, a "gap" or "space" is present in this pulse train at the time of occurrence of the main reference pulse signal. This results in a discontinuity in the sine wave which is subsequently formed from the auxiliary reference pulse signal, and an undesirable phase shift causing a corresponding error in bearing indications.

An object of the present invention is the provision of an improved aerial navigation system which will not be affected by changes in the percentage of modulation.

A still further object is to provide another piece of reference signal information to the auxiliary reference pulse train to obtain a continuous pulse train which will increase the reliability of the bearing indications under poor transmission conditions.

A feature of the present invention is to convert the reference pulse signals into sine waves. This enables one to phase shift the sine wave formed from the auxiliary reference pulses rather than phase shifting the presently shifted 135 cycle-per-second harmonic component. Therefore, any decrease in the percentage of modulation of the system will not affect the bearing accuracy, since only the 15 and 135 cycle-per-second audio components are affected by changes in the percentage of modulation and not the reference pulse signal.

Another feature of the present invention is the addition of north pulse information at a time when no auxiliary pulse is present. Thus, continuity of information is not interrupted by the missing auxiliary reference pulse burst which is present when the north reference pulse signal occurs. This results in an increase in the reliability of the bearing indications since, under weak signal conditions or high interference levels when perhaps a few of the auxiliary reference pulses will be masked out, the addition of this usable north reference information results in an appreciable increase in the composite phasing information.

Other and further objects of the present invention will become apparent, and the foregoing will be better understood with reference to the following description of embodiments thereof, reference being had to the drawings, in which:

Fig. 1 is a simplified block diagram of a TACAN type beacon transmitter and mobile receiver;

Fig. 2 is a diagram of the antenna structure and the radiation pattern of the antenna of the beacon; and Fig. 3 is a curve showing qualitatively the effective amplitude modulation envelope of the pulses transmitted from the beacon.

Referring to Fig. 1, a beacon station 1 emits pulses from its rotating antenna 2 according to a multi-lobed directional pattern 3, such as shown in Fig. 2. The pattern is rotated at the rate of 15 cycles per second. The antenna system may consist of a central omnidirectional antenna 4 with passive reflectors 5 spaced thereabout at 40 degrees separation, Fig. 2, and an additional single reflector 5a, the reflectors being, for example, printed on a pair of cylinders which rotate around the central radiator 4, the pattern consisting of a major lobe or directional configuration 7 produced by 5a with minor lobes 8 produced by reflectors 5 spaced every 40 degrees therefrom. For a more detailed understanding of antenna 2, reference should be made to the Pickles Karpeles Patent #2,803,821, issued August 20, 1957, under the title of "Radio Navigation Receiver."

Semi-random pulses are generated by a pulse generator 10 in the beacon which may be, for example, a free-running multivibrator. These pulses, generated at about 2700 per second before transmission, are applied to a pulse coder 11, which changes each single pulse into a pair of pulses spaced 12 microseconds apart. The pulses from the coder 11 are used to key or modulate an R.-F. oscillator in an R.-F. section 12 which may also include various amplifier stages. The R.-F. pulses are then fed to the antenna system 2 from whence they are omitted according to the directional pattern 3 of Fig. 2. The rotation of the antenna reflectors, in effect, produces an amplitude modulation envelope 13, Fig. 3, on the pulses, with a maximum amplitude peak 14a corresponding to the maximum lobe 7 and the other peaks 14b corresponding to the minor lobes 8. The multi-lobed antenna pattern which is rotating at 15 cycles per second produces a modulation envelope of 135 cycles per second (9 lobes multiplied by 15 c.p.s.) on top of the fundamental of 15 c.p.s.

As the antenna system 2 rotates causing the major lobe 7 to pass a given reference direction, such as north, a reference pulse signal is emitted which is called hereinafter the "main" or "north" reference signal 15. While north signal 15 is shown as a solid black line in Fig. 3, it actually consists of a number of pulses closely spaced together in a unique pattern for identification. As each minor lobe 8 passes the reference direction, remembering that the minor lobes are spaced by 40 degrees from each other and from the north lobe, an "auxiliary" reference signal 16 is emitted. This, likewise, is shown in Fig. 3 as a solid black line, but actually consists of a unique series of pulses closely spaced together. The north reference signals 15 may be produced by a pulse generator 17 which produces 12 pulses separated by 30 microseconds, which pulses are applied to the pulse coder 11 thereby producing 12 pulse pairs, or 24 pulses, with the spacing between the pulses of a pair being 12 microseconds. The auxiliary reference signals 16 may be generated by a generator 18 producing a burst of 6 pulses, separated 24 microseconds apart (from leading edge to leading edge), which are fed from the generator 18 into the pulse coder 11 where the 6 pulses are then doubled to become 6 pairs of pulses or 12 pulses with a 12 microsecond spacing between adjacent pulses.

Generators 17 and 18 may consist of conventional pulse generators feeding tapped delay lines or ringing circuits to produce a desired number of pulses with the proper spacing for the north or auxiliary reference groups as described above. Suitable timing means 19, which can take any one of various forms well known in the art, may be associated with the antenna system 2 and pulse generators 17 and 18 to cause the north and auxiliary reference signals to be emitted at the proper time.

The emitted pulses are received on a receiver 21 located in a mobile vehicle 20 (Fig. 2), such as an airplane. The signal is picked up on a omnidirectional antenna 22 and fed to a receiver 23, which removes the R.-F. envelope and detects the signal to produce amplitude modulated signals which contain the following four components:

(1) The 15 cycle-per-second envelope component.
(2) The 135 cycle-per-second envelope component.
(3) The north or main reference signal component.
(4) The auxiliary reference signal component.

The output of receiver 23 is fed into decoder 27 which consists essentially of a coincidence circuit 31 to which the input pulses are fed directly along line 53, the pulses, likewise being fed to said coincidence circuit 31 through a delay device 30 having a delay of 12 microseconds. The coincidence circuit 31 produces an output along line 24 when a delay pulse coincides with an input pulse directly applied thereto.

The aforementioned components are separated as follows. The output of coincidence circuit 31 is then fed via line 24 and line 34 to two filters, 25 and 26. The 15 cycle-per-second component, which is the component produced by the major lobe for each rotation, is separated from the amplitude modulated envelope by filter 25. The 135 cycle-per-second component, which is the component produced by the 40-degree minor lobe components, is separated from the amplitude modulated envelope by filter 26.

To separate the main and auxiliary reference signals, the output of coincidence circuit 31 is also fed to an amplifier and limiter circuit 33 via line 35, which removes the audio amplitude modulation therefrom. The output of limiter circuit 33 is then fed to a main signal separation circuit 28 and an auxiliary signal separation circuit 29, each of which includes a ringing circuit 32. The ringing circuit of the main signal separator 28 is tuned to approximately 33 kilocycles to respond to the north signal pulses which are separated by 30 microseconds. The ringing circuit 32 of auxiliary signal separator 29 is tuned to approximately 83 kilocycles to respond to the auxiliary signal pulses obtained from the decoder 27, which are separated by 12 microseconds. Pulses whose spacing does not correspond to the repetition frequency to which the various ringing circuits are tuned, will not produce oscillations of sufficient amplitude to produce indications. For this purpose, a threshold device may be incorporated either in said separators or in the circuits to which their outputs are connected.

The output of main signal separator 28 is fed to saw-tooth generator 39 via capacitor 36 and is also fed via capacitors 36 and 37 in series to the saw-tooth generator 44, where it combines with the output of the auxiliary signal separator 29 in saw-tooth generator 44. The components of the coupling capacitive network, which is composed of capacitors 36, 37, and 38, is of such value that the auxiliary reference signals generated by auxiliary signal separator 29 will not pass to saw-tooth generator 39 via capacitor 37, and the main reference signals generated by main signal separator 28 will pass through capacitor 37 in order to combine wtih the auxiliary reference signals in saw-tooth generator 44. For purposes of illustration, suitable values for the coupling capacitive network are as follows. Capacitors 36, 37, and 38 may have values of capacitance equal to .01 uf., 100 uuf., and 220 uuf., respectively. In feeding the output voltage of auxiliary signal separator 29 to the saw-tooth generator 39, it can be seen that the values of impedance from point 54 to the main signal separator are much lower than the impedance of capacitor 37. Therefore, the output voltage of auxiliary signal separator 29 is greatly attenuated; thus, only a negligible portion of this output voltage will be fed from saw-tooth generator 39 via capacitor 37. In addition, most of the output voltage of said auxiliary signal separator 29 will be applied to saw-tooth generator 44 as illustrated in waveform 56.

In feeding the output voltage of the main signal separator 28, it can be seen that the impedance from point 55 to the auxiliary signal separator 29 is approximately one-half the impedance of capacitor 37. Therefore, there is approximately an attenuation of 3 to 1 to the output voltage of the main signal separator at point 55. However, the output voltage of the main signal separator 28 is approximately three times greater in amplitude than the output voltage of the auxiliary signal separator 29. Thus, at point 55 the output voltage of the main signal separator is approximately the same amplitude as the output voltage of the auxiliary signal separator. Waveform 56 which represents the output of saw-tooth generator 44 shows the auxiliary reference pulse signals with the main reference pulse signal mixed in. Waveform 67 represents the output of saw-tooth generator 39, which shows the main reference pulse signal with a negligible amount of auxiliary reference signal pulses mixed in.

Now referirng back to Fig. 1, the output of saw-tooth generator 39 is fed into a 15 cycle filter network 40 which extracts an output wave having the same repetition frequency as the fundamental 15 cycle-per-second component. This output wave is fed into phase comparator 41 where it is compared to the fundamental 15 cycle-per-second component derived from the filter 25. The fundamental 15 cycle-per-second component is continuously varied by variable phase shifter 42. In addition, the output of phase shifter 42 is then used to trigger a gate pulse generator 57, which will produce a gate pulse of 40 degrees duration (when 360 degrees is the period of one rotation of the multi-lobed directional pattern). Gate pulse generator 57 is essentially a conventional plate coupled monostable multi-vibrator. Coincidence between the 40-degree gate pulse produced by generator 57 and the main reference pulse produced by main signal separator 28 is detected in coincidence detector 59 to produce an output. The output of coincidence detector 59 is fed into a relay driving circuit 60 which energizes coil 63. The relay driving circuit 60 may consist of a tube arrangement having the relay coil located in its plate circuit. When the output of coincidence detector 59 is fed into this tube, plate current will begin to flow in coil 63 and thus actuate the relay 61. The system prior to coincidence between the 40-degree gate and the main reference pulse, and actuation of relay 61 is in "coarse" operation. With relay 61 in its de-energized position, voltage produced by phase comparator 41 is applied via contacts 62 and 68 and armature 64 of relay 61 to a motor drive circuit 52, which in turn drives motor 50, the motor 50 being connectable through suitable linkage 48 to the phase shifter 42. The output of phase comparator 41 which is dependent upon the phase relation between the 15 cycle-per-second component and the main reference pulse is used to control the direction and speed of drive motor 50. As the azimuth location of the aircraft changes, the phase relation between the 15 cycle-per-second component and the main reference pulse changes. Thus, the phase shifter 42 continuously varies the 15 cycle-per-second component in such a direction as to produce a "null" at the output of phase comparator 41. When this "null" is reached, motor 50 will come to rest and this position will be indicative of the "coarse" indication of bearing as indicated in bearing indicator 51.

Upon actuation of relay 61, due to the coincidence, the receiver goes into "fine" operation for a more accurate indication of bearing. Once the receiver is in "fine" operation, it is controlled by the output derived as a result of the phase comparison of the auxiliary reference pulses with the 135 cycle-per-second harmonic component. The output of the 135 cycle-per-second filter 26 is fed into phase comparator 47. In addition, the output of the auxiliary signal separator 29 and the output of the main signal separator are mixed in sawtooth generator 44. The output of saw-tooth generator 44 is then fed into the 135 cycle filter network 45 which extracts an output wave having the same repetition frequency as the harmonic 135 cycle-per-second component.

The output of filter 45 is fed into phase shifter 46. This phase shifted output, which is continuously varied as a result of being coupled to the output of drive motor 50 through a 9 to 1 reduction gear train 49, is fed directly into phase comparator 47. The output of phase comparator 47 is dependent upon the phase relation between the 135 cycle-per-second component and the auxiliary reference pulses, and is used to control the speed and direction of drive motor 50. Under operating conditions, the phase between the 135 cycle-per-second component and the auxiliary reference pulses varies as the azimuth position of the aircraft changes. Thus, phase shifter 46 varies the phase of the voltage produced from the auxiliary reference pulses in such a direction as to produce a "null" in the output of phase comparator 47. The output of phase comparator 47 is then fed into a motor drive circuit 52 through contacts 65 and 66 of relay 61. When the "null" is reached at the output of phase comparator 47, motor 50 will then come to rest. The bearing indication of the receiver will then be read on bearing indicator 51 which is coupled directly to the output of drive motor 50.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radio navigation receiver for determining the bearing of said receiver with respect to a beacon which produces a complex signal comprising fundamental and harmonic waves modulated with spaced main and auxiliary reference pulses which have predetermined repetition frequencies equal to the frequencies of said fundamental and harmonic waves respectively, said receiver comprising means for separating the fundamental and harmonic waves from said complex signal, means to translate the pulse energy of said main and auxiliary reference pulses into first and second waves respectively, first and second saw-tooth generators, means to couple said first wave to said first saw-tooth generator, means to combine and apply said first and second waves to said second saw-tooth generator, a first filter means coupled to the output of said first saw-tooth generator to derive an output wave having a frequency corresponding to the repetition frequency of said main reference pulses, a second filter means coupled to the output of said second saw-tooth generator to derive an output wave having a frequency corresponding to the repetition frequency of said auxiliary reference pulses, a first phase shifting means for shifting the relative phase between said fundamental wave and the output wave of said first filter, a second phase shifting means for shifting the relative phase between the output wave of said second filter and said harmonic wave, gate pulse producing means coupled to said first phase shifter for producing a gating pulse of a given width responsive to said fundamental wave, first comparing means for comparing the phase difference of said fundamental wave and the output of said first filter and second comparing means for comparing the phase difference of said harmonic wave and the output of said second filter, a motor normally connected to the output of said first comparing means to control said first and second phase shifting means, switching means responsive to the phase coincidence between said gating pulse and said first wave to switch said motor from the output of said first comparing means to the output of said second comparing means, and a bearing indicator means coupled to said motor.

2. A radio navigation receiver as in claim 1 wherein said means to combine and apply said first and second waves to said second saw-tooth generator includes a coupling capacitive network comprising first, second, and third capacitors, said first capacitor coupling the output of said first wave producing means to said first saw-tooth generator, said third capacitor coupling the output of said second wave producing means to said second saw-tooth generator, and said second capacitor coupling the input of said first saw-tooth generator to the input of said second saw-tooth generator.

3. A radio navigation receiver as in claim 2 wherein said first wave has a higher amplitude than said second wave, said first capacitor having a smaller impedance than said second and third capacitors, said third capacitor having a smaller impedance than said second capacitor, said first wave being coupled to said first saw-tooth generator through said first capacitor and being coupled to said second saw-tooth generator through said first and second capacitors so as to combine with said second wave, said second capacitor attenuating said first wave to substantially approximate the amplitude of said second wave, said second wave being coupled to said second saw-tooth generator, and said second capacitor substantially blocking the second wave so as to prevent any appreciable combining of said second wave to said first wave in said first saw-tooth generator.

4. In a circuit having an input of main and auxiliary reference pulses comprising means to translate the pulse energy of said main and auxiliary reference pulses into first and second waves respectively, first and second saw-tooth generators, a coupling capacitive network comprising first, second, and third capacitors to couple the output of said first and second wave producing means to said first and second saw-tooth generators, said first wave being coupled to said first saw-tooth generator through said first capacitor and being coupled to said second saw-tooth generator through said first and second capacitors so as to combine with said second wave, said first capacitor having a lower impedance than said second and third capacitors, said third capacitor having a smaller impedance than said second capacitor, said second wave being coupled to said second saw-tooth generator, and said second capacitor substantially blocking the second wave so as to prevent any appreciable combining of said second wave to said first wave in said first saw-tooth generator.

No references cited.